3,264,069
AGGLOMERATING ALUMINA
Robert J. Getty, Webster Groves, Mo., assignor to Aluminum Company of America, Pittsburgh, Pa., a corporation of Pennsylvania
No Drawing. Filed Sept. 27, 1965, Ser. No. 490,622
8 Claims. (Cl. 23—313)

This application is a continuation-in-part of United States patent application Serial No. 195,963, filed May 18, 1962.

This invention relates to a process for making alumina balls and relates particularly to making alumina balls which have high mechanical strength by tumbling alumina particles and a binder in a rotating drum or cylinder.

It is well known that hydrous alumina (i.e., crystalline alumina hydrate, gelatinous-type alumina, and ores containing hydrated alumina, such as bauxite), contains free or loosely held water, in addition to water which is held sufficiently firmly that to drive it off relatively high temperatures are required. When such materials are heated under such conditions as to drive off most—but not all—of its water content, they are converted to a hard, highly porous, and adsorbent material. Such materials, which are referred to herein by the expression "activated alumina," are very effective in adsorbing moisture or water vapor from liquids or gases, useful as catalysts and as a catalyst base or carrier upon which to place or deposit various materials possessing catalytic activity.

It is also known that activated alumina may, at times, be advantageously used in agglomerated masses, such as in ball form. The ability of balled activated alumina in use (for example, as either a catalyst or desiccant) to resist breakdown into smaller particles and powdering during use is an extremely important factor in the economical and efficient operation of commercial plants. When used as a desiccant, balled activated alumina minimizes pressure drop through the bed because of the relatively smooth flow passages. The uniform size and distribution of the voids permit uniform flow of gas or liquid through all sections of the bed. Another advantage of balled activated alumina is that it permits substantial uniformity in the distribution of reactants and for the control of reaction conditions for which it is used. Activated alumina particles may be formed into ball-shaped agglomerates by rolling or tumbling particles thereof, in a rotating cylinder or drum. The activated alumina particles are tumbled along with a binder which may be added to the mass of particles in any suitable manner, such as for example, by spraying while the particles are being rolled or tumbled. As the moistened mass of activated alumina particles is tumbled, the particles are gradually compacted into hard, dense aggregates. This method of agglomerating finely divided materials is described in U.S. Patents 2,413,693; 2,293,439; and 2,561,055.

In the preparation of alumina balls in that manner, one of the main problems in the art has been to produce balls sufficiently hard and resistant to attrition to withstand severe conditions of operation. Alumina balls are often used in operating conditions wherein the balls are subject to constant movement and vibration, causing sharp impact and rubbing of the balls against one another and against the walls of the container. Under these conditions the harder and more abrasion resistant the alumina balls are, the less abrasion and crushing loss is incurred.

It is an object of this invention to provide a method of producing mechanically strong alumina balls, and it is a further object of this invention to provide a method which produces alumina balls having high crushing resistance and low abrasion loss.

In accordance with this invention, hydrous alumina particles are activated to a loss on ignition of from 5–14%, by weight, by heating. Preferably activation of the alumina particles is carried out at a temperature of 500° F. or above for a sufficient period of time to arrive at the proper loss on ignition. In general, the higher the temperature employed, the shorter the period required to arrive at the proper loss on ignition. Such activation may be performed, for example, in a tower, tunnel or kiln. Alumina balls are formed from a mass of such activated alumina particles wherein at least 88% of the particles of the mass are less than 45 microns in maximum dimension, 20–35% of the particles of the mass are less than 5 microns in maximum dimension and the median size of the particles is 8–17 microns. To obtain the proper particle size the activated alumina may be ground in a ball milling machine, if desired. The alumina balls may be formed by tumbling in a rotating cylinder type ball-forming machine while being sprayed with a binder liquid in the manner described above. The binder may be water, aluminum chloride, or some suitable dilute acid. Generally the balls range in size from ⅛ to ¼ inch, however this process is not limited to making balls within this range.

After the alumina balls have reached the desired size in the ball forming apparatus, they are removed and heated to a desired loss on ignition. This loss on ignition of the alumina balls will vary depending upon what the loss on ignition in the alumina balls should be to best suit the purpose for which such balls will ultimately be used. Generally, the loss on ignition for the alumina balls should be in the range of 1 to 12% by weight. Prior to final heating I prefer to age the formed alumina balls to obtain additional mechanical strength. This may be accomplished by placing the alumina balls in a suitable container for a period of time.

I have found that alumina agglomerates made in accordance with the above-described invention have superior mechanical properties, such as high crushing resistance and low abrasion loss, when compared with agglomerates not made in accordance therewith.

The high mechanical strength of the alumina balls resulting from the above-described process is illustrated in the examples set forth below. In the examples the mechanical strength was determined by both a crushing resistance test and an abrasion loss test.

The crushing resistance test for ¼ inch balls consisted of weighing 100 grams of dust-free sample, placing the sample in a cylinder 4.75 inches long by 1.75 inches (inside diameter) and subjecting the sample to 2000 p.s.i. pressure for 60 seconds by means of a Carver press. The percentage of the sample retained on a Tyler 4 (U.S. Standard 4) Standard screen mesh sieve after shaking on a Ro-Tap for two minutes is weighed and reported as crushing resistance.

The abrasion loss test consisted of weighing 160 grams of dust-free sample, placing the sample on a Tyler 28 Standard screen mesh sieve and shaking on a Ro-Tap for 30 minutes. The percentage of minus 28-mesh sample is reported as abrasion loss.

*Example I*

Alumina gel particles were activated to a loss on ignition of about 10.4% by weight, by heating in a kiln. The resultant material was then ground to give a particle size distribution as follows: 95% of the particles were less than 45 microns in maximum dimension, 35% were less than 5 microns in maximum dimension and the median particle size was 11.1 microns. The ground alumina was then formed into balls ¼ inch in diameter by rotating and tumbling the particles in a cylinder type ball-forming machine while being sprayed with water to effect the agglomeration. The resultant balls were then placed in a closed container and aged at ambient temperature for 20 hours. Thereafter the alumina balls were heated to a loss on ignition of 5.6% by weight. The resultant alumina balls were subjected to the crushing resistance test described above and showed a resistance of 90.1%. The abrasion loss test, also described above, showed a loss of 0.26%.

*Example II*

Crystalline alumina trihydrate particles were partially activated to a loss on ignition of about 9%, by weight, by heating in a kiln. The resultant material was then ground to give a particle size distribution as follows: 93% of the particles were less than 45 microns in maximum dimension, 33% were less than 5 microns in maximum dimension, and the median particle size was 12 microns. The particles were formed into balls ¼ inch in diameter in the same manner as described in Example I. The alumina balls were placed in a closed container and aged at ambient temperature for 16 hours. Thereafter the alumina balls were heated to a loss on ignition of 5%, by weight. The crushing resistance of the resultant balls was about 91% and the abrasion loss was 0.08%.

*Example III*

Chemical grade bauxite particles were activated to a loss on ignition of about 9.4% by weight, by heating in a kiln. The resultant material was then ground to give the following particle size distribution: 95% of the particles were less than 45 microns in maximum dimension, 35% were less than 5 microns in maximum dimension and the median particle size was 11 microns. The ground bauxite was then formed into balls ¼ inch in diameter in the same manner as described in Example I. The bauxite balls were placed in a closed container and aged at ambient temperature for 16 hours. Thereafter the bauxite balls were heated to a loss on ignition of 4.4%. The crushing resistance of the resultant balls was about 79% and the abrasion loss was 0.07%.

*Example IV*

Alumina gel particles were activated to a loss on ignition of about 5.9% by weight, by heating in a tunnel activator. The resultant material was then ground to give a particle size distribution as follows: 91% of the particles were less than 45 microns in maximum dimension, 29% were less than 5 microns in maximum dimension and the median particle size was 13.3 microns. The finely divided alumina was then formed into balls ¼ inch in diameter in the same manner as described in Example I. The alumina balls were placed in a closed container and aged at ambient temperature for 12 hours. Thereafter the alumina balls were heated to a loss on ignition of 5.9%, by weight. The crushing resistance of the resultant balls was about 73% and the abrasion loss was 0.12%.

*Example V*

Crystalline alumina trihydrate particles were partially activated to a loss on ignition of about 9%, by weight, by heating in a kiln. The resultant particles were then ground but without controlling the particle size distribution as in Example I above. The ground particles, which had a median particle size of 23 microns, were then formed into balls ¼ inch in diameter in the same manner as described in Example I above. The resultant balls were then placed in a closed container and aged at ambient temperature for 20 hours. Thereafter the alumina balls were heated to a loss on ignition of 5%, by weight, by heating in a kiln. The crushing resistance of the resultant balls was 54% while the abrasion loss was 0.49%.

*Example VI*

Crystalline alumina trihydrate particles were partially activated to a loss on ignition of about 17.4%, by weight, by heating in a kiln. The resultant material was ground to obtain the same particle size distribution as in Example I above but with a slightly different median particle size of 14 microns and formed into ¼ inch balls in the same manner. The balls were aged at ambient temperature for 20 hours. Thereafter the alumina balls were heated to a loss on ignition of 5%, by weight. The crushing resistance of the resultant balls was 45% while the abrasion loss was 0.28%.

The above examples demonstrate that Examples I, II, III and IV, which were performed in accordance with the invention, showed superior results regarding crushing resistance and abrasion loss when compared with the results obtained in Example V and Example VI, neither of which were performed in accordance with the invention.

What is claimed is:

1. The process of producing alumina agglomerates comprising tumbling a mass of finely divided activated alumina particles in a rotating drum while mixing a binder therewith, whereby the particles agglomerate into pellets, said alumina having a loss on ignition of between 5–14%, by weight, and having a particle size distribution of at least 88% less than 45 microns in maximum dimension, 20–35% less than 5 microns in maximum dimension and a median particle size of 8–17 microns, and thereafter heating the resultant agglomerates.

2. The process of producing alumina agglomerates, comprising heating hydrous alumina particles to a loss on ignition of 5–14% by weight, tumbling a mass of the activated alumina particles in finely divided form in a rotating drum while spraying a liquid binder thereon, whereby the particles agglomerate into pellets and are compacted by tumbling in the drum into dense, hard agglomerates, at least 88% of the particles of the said mass being less than 45 microns in maximum dimension, 20–35% of the particles of the mass having a maximum dimension of less than 5 microns, and the median size of the particles being 8–17 microns, and thereafter heating the said agglomerates.

3. The process of producing alumina agglomerates comprising tumbling a mass of finely divided activated alumina particles in a rotating drum while mixing a binder therewith, whereby the particles agglomerate into pellets, said alumina having a loss on ignition of between 5–14%, by weight, and having a particle size distribution of at least 88% less than 45 microns in maximum dimension, 20–35% less than 5 microns in maximum dimension and a median particle size of 8–17 microns, and thereafter heating the agglomerates to a loss on ignition of between 1–12%, by weight.

4. The process of producing alumina agglomerates comprising tumbling a mass of finely divided activated alumina particles in a rotating drum while mixing a binder therewith, whereby the particles agglomerate into pellets, said alumina having a loss on ignition of between 5–14%, by weight, and having a particle size distribution of at least 88% less than 45 microns in maximum dimension, 20–35% less than 5 microns in maximum dimension and a median particle size of 8–17 microns, aging the agglomerates, and thereafter heating the agglomerates to a loss on ignition of between 1–12%, by weight.

5. The process of producing alumina agglomerates, comprising heating hydrous alumina particles to a loss on ignition of 5–14%, by weight, grinding the activated alumina to a particle size where at least 88% of the finely divided particles are less than 45 microns in maximum dimension, 20–35% of the particles are less than 5 microns in maximum dimension, and the median particle size is 8–17 microns, tumbling a mass of the resultant particles in a rotating drum while spraying a liquid binder thereon, whereby the particles agglomerate into pellets and are compacted by tumbling in the drum into dense, hard agglomerates, and thereafter heating the said agglomerates.

6. The process of producing alumina agglomerates comprising heating hydrous alumina particles to a loss on ignition of between 5–14%, by weight, grinding the activated alumina to a particle size where at least 88% of the finely divided particles are less than 45 microns in maximum dimension, 20–35% of the particles are less than 5 microns in maximum dimension, and the median particle size is 8–17 microns, forming the resultant material into agglomerates by tumbling the said material in a rotating drum while mixing a liquid binder therewith, aging the agglomerates, and heating the agglomerates to a loss on ignition of between 1–12%, by weight.

7. The process of producing alumina agglomerates comprising heating hydrous alumina particles to a loss on ignition of between 5–14%, by weight, grinding the activated alumina to a particle size where at least 88% of the finely divided particles are less than 45 microns in maximum dimension, 20–35% of the particles are less than 5 microns in maximum dimension, and the median particle size is 8–17 microns, forming the resultant material into agglomerates by tumbling the said material in a rotating drum while mixing a liquid binder therewith, aging the agglomerates, and heating the agglomerates to a loss on ignition of between 1–12%, by weight.

8. The process of producing alumina agglomerates, comprising heating hydrous alumina particles to a loss on ignition of 5–14%, by weight, grinding the activated alumina to a particle size where at least 88% of the finely divided particles are less than 45 microns in maximum dimension, 20–35% of the particles are less than 5 microns in maximum dimension, and the median particle size is 8–17 microns, tumbling a mass of the resultant particles in a rotating drum while spraying water thereon, whereby the particles agglomerate into pellets and are compacted by tumbling in the drum into dense, hard agglomerates, aging the aggregates, and thereafter heating the said agglomerates to a loss on ignition of between 1–12% by weight.

References Cited by the Examiner

UNITED STATES PATENTS

| | | | |
|---|---|---|---|
| 2,635,950 | 4/1953 | Robinson | 23—313 |
| 2,881,051 | 4/1959 | Pingard | 23—143 |

FOREIGN PATENTS 802,953   10/1958   Great Britain.

NORMAN YUDKOFF, *Primary Examiner.*

S. EMERY, *Assistant Examiner.*